United States Patent [19]

Kishi et al.

[11] Patent Number: 5,476,908

[45] Date of Patent: Dec. 19, 1995

[54] THERMOSETTING RESIN COMPOSITION, CURED RESIN PRODUCT, PREPREG AND FIBER-REINFORCED PLASTIC

[75] Inventors: Hajime Kishi, Nara; Nobuyuki Odagiri; Kuniaki Tobukuro, both of Shiga, all of Japan

[73] Assignee: Toray Industries, Inc., Tokyo, Japan

[21] Appl. No.: 47,053

[22] Filed: Apr. 12, 1993

Related U.S. Application Data

[63] Continuation of Ser. No. 478,197, Feb. 12, 1990, abandoned.

[30] Foreign Application Priority Data

Feb. 10, 1989 [JP] Japan ..................... 1-32424

[51] Int. Cl.$^6$ .................................................. C08G 65/48
[52] U.S. Cl. .................. 525/393; 525/422; 525/423; 525/431; 525/474; 525/476; 525/902
[58] Field of Search ..................... 525/435, 430, 525/423, 470, 472, 902, 393, 431, 474; 523/435, 430

[56] References Cited

U.S. PATENT DOCUMENTS

| | | | |
|---|---|---|---|
| 4,500,688 | 2/1985 | Arkles | 525/431 |
| 4,529,755 | 7/1985 | Nishikawa et al. | 523/436 |
| 4,604,435 | 8/1986 | Koshii et al. | 525/476 |
| 4,656,207 | 4/1987 | Jabloner et al. | 523/400 |
| 4,663,397 | 5/1987 | Morita et al. | 525/398 |
| 4,680,076 | 7/1987 | Bard | 156/306.9 |
| 4,794,148 | 12/1988 | Nakamura et al. | 525/530 |
| 4,822,832 | 4/1989 | Chu et al. | 523/423 |
| 4,849,469 | 7/1989 | Crosby et al. | 524/439 |
| 4,855,339 | 8/1989 | Saito et al. | 523/400 |
| 4,882,370 | 11/1989 | Jordan et al. | 523/215 |
| 4,957,995 | 9/1990 | Saito et al. | 528/99 |
| 4,962,162 | 10/1990 | Kosuda et al. | 525/422 |
| 5,006,581 | 4/1991 | Nakane et al. | 524/266 |
| 5,021,519 | 6/1991 | Varde et al. | 525/423 |
| 5,041,474 | 8/1991 | Kim et al. | 523/435 |

FOREIGN PATENT DOCUMENTS

| | | | |
|---|---|---|---|
| 99338 | 1/1984 | European Pat. Off. | 525/423 |
| 108476 | 5/1984 | European Pat. Off. | |
| 63-095222 | 4/1988 | Japan. | |
| 1-606019 | 1/1989 | Japan. | |
| 730750 | 5/1980 | U.S.S.R. | 525/423 |

Primary Examiner—Ralph H. Dean
Attorney, Agent, or Firm—Foley & Lardner

[57] ABSTRACT

A cured resin product has a strain energy release rate (GIC) of at least 400 J/m$^2$, a flexural modulus of at least 300 Kg/mm$^2$, and a glass transition temperature (Tg) of at least 120° C. The cured resin composition comprises a thermoset resin component (A), optionally including a curing agent (B), and a thermoplastics resin component (C), the thermoplastics resin and thermoset resin components (C) and (A) being present at least partly in respective phases (1) and (2) each being elongate in at least one direction and each preferably having a three dimensionally continuous structure. Phase (1) may contain a silicon containing compound providing a concentration therein of elemental silicon higher than that in any other phase, and/or the cured resin product may additionally include regions where one of the phases (1) and (2) essentially surrounds the other. The thermoplastics resin (C) may be a block or graft copolymer comprising a molecular chain compatible with, and molecular chain incompatible with, the thermoset resin (A). A composition containing the above components (A) to (C) may be compounded with fibrous reinforcement to provide a prepreg curable to obtain a high strength fiber reinforced plastics material.

12 Claims, 4 Drawing Sheets

THERMOSETTING RESIN COMPOSITION, CURED RESIN PRODUCT, PREPREG AND FIBER-REINFORCED PLASTIC

This application is a continuation of U.S. application Ser. No. 07/478,197 filed Feb. 12, 1990, now abandoned.

BACKGROUND OF THE INVENTION

1. Field of the Invention

The present invention relates to a thermosetting resin composition, a prepreg using this composition as a matrix resin, a cured resin product and a fiber-reinforced plastics material having excellent characteristics such as high toughness, high elongation, high modulus, low internal stress characteristics and furthermore, high heat resistance and low water absorption.

2. Description of the Prior Art

Thermosetting resins have been widely used in a variety of industrial fields such as molding, lamination and adhesion by utilizing their excellent mechanical characteristics and chemical resistance. Especially for fiber reinforced composite materials where a reinforcing fiber and a matrix resin are essential constitutional elements, a variety of thermosetting resins, especially epoxy resins are widely used. However, there exists a defect that cured thermosetting resins are generally brittle and accordingly problems arise from the resulting poor impact resistance and low elongation at break of the cured products. Above all, when these resins are used as structural materials in, for example, aircraft and automobiles, poor impact resistance becomes a great problem.

On the other hand, in the fields of semiconductors such as condensers, diodes, transistors and integrated circuits such as IC, LSI, especially as sealing materials protecting mechanically and electrically semiconductors from outer environments, epoxy resins are mainly used at the present time. However, in these applications, there also exists a problem that internal stress is generated due to a difference in linear expansion coefficient between epoxy resins and silicon chips or lead frames or due to strain on curing. This internal stress causes defects and cracks in protective films for semiconductor elements and furthermore, cracks in semiconductor elements themselves. Moreover, this internal stress causes strains in lead frames, which tends to cause poor insulation between frames.

A variety of trials shown below have been carried out to improve these defects, especially the brittleness of thermoset resins.

(1) Toughness of the cured product can be improved by incorporating in an epoxy or phenol resin composition a rubbery polymer having terminal functional groups (e.g., carboxyl group-terminated butadieneacrylonitrile rubbers). However, in this trial, there existed a defect that elastic modulus (especially, elastic modulus at higher temperature) decreased remarkably.

(2) A highly heat-resistant thermoplastic resin was incorporated in an epoxy resin composition. C. B. Bucknall et al. investigated polyethersulfone as a thermoplastic resin for modifying an epoxy resin composition (British Polymer Journal, (1983), Vol.15 p.71). From this study, they obtained results and conclusions that the cured resin had a structure where micro phases were separated and included a domain where polyethersulfone existed in high concentration. However, the effect of the addition of the polyethersulfone on improving toughness of the cured resin was small regardless of the degree of the phase separation and the composition.

(3) At the 7th International Conference SAMPE European Chapter p.163 (1986), Muraki et al. reported that toughness of the cured resin and impact resistance of CFRP could be improved by modifying an epoxy resin with a thermoplastic resin such as a polyethersulfone. However, the values of toughness described there were still insufficient. They reported that the morphology varied with the composition, but the correlation between the morphology and the toughness could not be clarified.

(4) U.S. Pat. No. 4,656,208 and JP-A-228016/1986 disclosed the incorporation into an epoxy resin composition of a polysulfone oligomer having terminal epoxy reactive functional groups. The cured resin had a microphase separating structure (islands-in-a-sea structure) and the polysulfone existed in a continuous phase with a high concentration. As a result, good heat resistance and high toughness were obtained. J. F. McGrath presented a similar investigation at the 31st SAMPE Symposium p.580 (1986). Toughness of the resin increased with increase in the molecular weight and the amount of loading of polysulfone, but there was a defect that the viscosity of the system accordingly increased and processability decreased. No reference was made to water resistance, but we would estimate that as the water resistance was largely influenced by the water absorption ratio of the epoxy resin, it did not result in any improvement. EP-A-0311349 (1989), discloses the results of an investigation where an amine-terminated polyarylsulfone is incorporated into an epoxy resin. The morphology of the desired cured resin is not clear, as the picture shown there is not clear, but it appears that the morphology varies in dependence upon the amount of $SO_2$ in the polymer chain of the polyarylsulfone, namely (a) a generally homogeneous structure provided by too small an amount of $SO_2$, (b) a structure containing separate respective phases, the polyarylsulfone being a continuous phase and the epoxy resin being an island phase, which structure is provided by too great an amount of $SO_2$ and (c) the desired structure containing separate respective phases of the polyarylsulfone and epoxy resin, but both phases being continuous. The highest toughness was obtained when both the polyarylsulfone phase and the epoxy resin phase had continuous structures. However, we would estimate that the water absorption ratio of this resin system was also largely influenced by the water absorption ratio of the base epoxy resin so that no large improvement would result.

(5) E. M. Yorkgitis et al. reported in Advanced Polymer Science Vol.92 p.79 (1985) that fracture toughness could be improved by introducing a rubbery structure of a siloxane chain in the main chain skeleton of an epoxy resin. However, the effect was not enough and the elastic modulus remarkably decreased. Furthermore, Nonogaki et al. reported in the Preprint of the Society of Polymer Science, Japan Vol.36, No.3, p.739 (1987) that an ethynyl group-terminated siloxane imide oligomer was incorporated in an epoxy resin and the cured product was tough, but the elastic modulus decreased due to the influence of the siloxane skeleton. As described above, in all the conventional methods in which attempts were made to improved toughness defects remained in that in some cases the effects were insufficient and in other cases modulus, heat resistance and processability decreased. There was no method in which high toughness, high elongation and low water absorption could be accomplished while high heat resistance and high modulus were retained. We have conducted extensive investigations in an attempt to provide a thermosetting resin composition having good processability and shelf-life and capable of providing cured products, especially FRPs, having high toughness, high elongation and low internal stress characteristics together with high strength, high modulus, low water absorption and high heat resistance, as well as an excellent ability to maintain these characteristics.

Compositions in accordance with the invention, with which such advantages may be obtained, and cured products produced therefrom are described below. In particular, prepregs in which the compositions are used as matrix resins and cured fiber-reinforced plastics materials produced from such prepregs are described.

SUMMARY OF THE INVENTION

A resin composition in accordance with the present invention comprises the following components, namely a thermosetting resin (A), a curing agent (B) which is optionally present, and a thermoplastics resin (C).

The composition is curable to provide a cured resin product in which a thermoplastics resin provided by compound (C) is present at least partly in a phase (1) and in which a thermoset resin provided by components (A) and, when present, (B) is present at least partly in a phase (2). Each of the phases (1) and (2) is elongate in at least one direction and phases (1) and (2) may be interconnected by chemical bonds.

Preferably, in the cured resin product, the thermoplastics resin component (C) is at least a major part of phase (1), while the thermoset resin provided by (A) and (B) provides at least a major part of phase (2).

In a preferred morphology of the cured resin product, each of phases (1) and (2) is continuous in at least two, and more preferably three, dimensions. For example, the structure may comprise one phase, preferably phase (1), in the form of a network embedded within the other phase, preferably phase (2).

In a more preferred morphology produced on curing, both phases each become a micro phase-Separation structure which is most preferably continuous in three dimensions.

In some cases, the cured product additionally comprises dispersed parts of the other phases included one within the other continuous phase.

According to certain aspects of the present invention there is provided a cured resin product comprising a thermoset resin (A), optionally including residues provided by a curing agent (B), and a thermoplastics resin (C), which cured resin product comprises at least a phase (1) in which the thermoplastics resin (C) is at least a major constituent and a phase (2) in which the resin (A) is at least a major constituent, each of which phases (1) and (2) is separate one from the other and has a three dimensionally continuous structure, characterised in that
(i) the cured resin product additionally includes regions where one of the phases (1) and (2) essentially surrounds the other, and/or
(ii) the phase (1) contains a silicon containing compound providing in phase (1) a concentration of elemental silicon higher than that in any other phase.

It is pointed out that although (as discussed above) the cured resin products of EP-A-0311349, published after the priority date of this application, may have a morphology as described in the precharacterising part of the above paragraph, there is no disclosure therein of either feature (i) or (ii) above.

Furthermore, the invention provides, according to another aspect, a cured resin product having a strain energy release rate (GIC) of at least 400 J/m$^2$, a flexural modulus of at least 300 Kg/mm$^2$ and a glass transition temperature (Tg) of at least 120° C., which cured resin product may comprise at least two phases one of which contains a silicon containing compound providing in one phase a concentration of elemental silicon higher than in any other phase.

In a resin composition according to another aspect of the invention which is curable to provide high strength cured resin products, the thermoplastics resin (C) is a copolymer selected from block copolymers and graft copolymers each comprising a molecular chain compatible with, and a molecular chain incompatible with, at least one of the thermosetting resin (A) and curing agent (B).

A terminally active polymer in accordance with the invention which is useful in preparing such resin compositions is a polyimide, polyamide or polyether, which polymer is derived from at least two reactants capable of providing, in the polymer, respective residues (a) and (b) of the formula

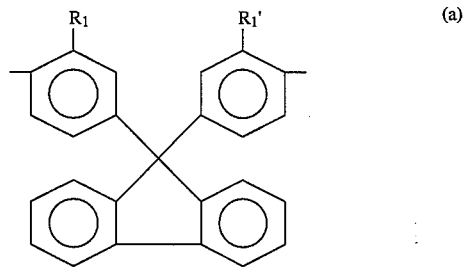

(a)

wherein $R_1$ and $R_2$ are, independently of one another, each selected from hydrogen and a group $C_mH_{2m+1}$, where m is at least 1, and

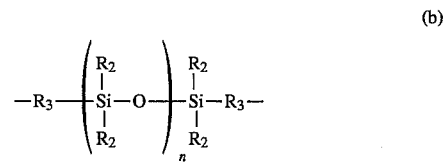

(b)

wherein $R_2$ is a hydrocarbyl group (optionally interrupted by a hetero atom), $R_3$ is a hydrocarbylene-radical (optionally interrupted by a hetero atom) and n is from 1 to 20 inclusive. Preferably $R_2$ is a $C_{1-4}$ alkyl or phenyl group and $R_3$ is a $C_{1-4}$ alkylene or phenylene group. A preferred value of m is from 1 to 4 inclusive. The groups $R_1$ and $R_1'$ are preferably hydrogen.

Resin compositions in accordance with the invention are especially suitable for providing fiber reinforced plastics (FRP) materials and further aspects of the invention provide such FRP materials and prepregs from which they can be moulded.

DESCRIPTION OF THE PREFERRED EMBODIMENTS

The morphology of a resin and the path at fracture (morphology of fracture) are closely related. In other words, the path through which the fracture develops reflects the morphology of the resin. There is a tendency that the more complex is the path of fracture, the higher is the toughness of the resin. This is because the energy consumed for fracturing a unit area of the resin becomes larger with increasing complexity of the path of the fracture. A preferred cured resin product embodying the present invention has a phase wherein the component (C) is a main component and another phase wherein the components (A) and (B) form a micro phase-separation structure and both phases each have a continuous part. As these two phases have different respective modulae, when a stress is applied to the resin product, the stress is concentrated at the interfaces of the phases and the fracture tends to develop along this phase structure. In this instance, if components of the phases are bound with chemical bonds, then as a result, no interfacial peeling of the phases occurs. Thus, the fracture is developed in such a manner that the highly tough phase in which the component (C) is a main component is torn. Therefore, in the system embodying the present invention wherein both phases have a continuous structure in three dimensions, fracture does not simply extend in the direction of a macrofracture; the fracture extends in such a way that unevenness are produced in the direction vertical to the fracture face. Accordingly, the energy needed for fracturing a unit area of the resin becomes larger than that of the resins having a homogeneous structure or an islands-in-a-sea structure. As a result, a remarkably high toughness is exhibited. Another structure wherein furthermore fine dispersing phases of other phases are included in the continuous phases is also preferable and furthermore high complexity of the path of the fracture and the mechanism of energy absorption can be thereby brought about.

In cured resins embodying the present invention, in the continuous phase wherein the component (C) is a main component, the width in the width direction is preferably about 0.01 to 10 μm. If it is 0.01 μm or smaller, the unevenness of the fracture face is small, so the path of the fracture becomes short and toughness tends to be decreased.

As a result, the toughness is not particularly high. If it is above 10 μm, the path of the fracture is simplified and the effect of providing high toughness becomes little. A more preferable range of width dimensions is about 0.1 to 3 μm. Likewise, the diameter of a dispersed phase in the continuous structure is preferably about 0.01 to 10 μm. A more preferable range is about 0.1 to 3 μm.

On the other hand, the maximum dimensions of both phases may be much greater such that, for example, the length/width ratio may be 10/1 and each phase may extend continuously for at least 10% of the total dimensions of the cured resin product.

Figure 1:
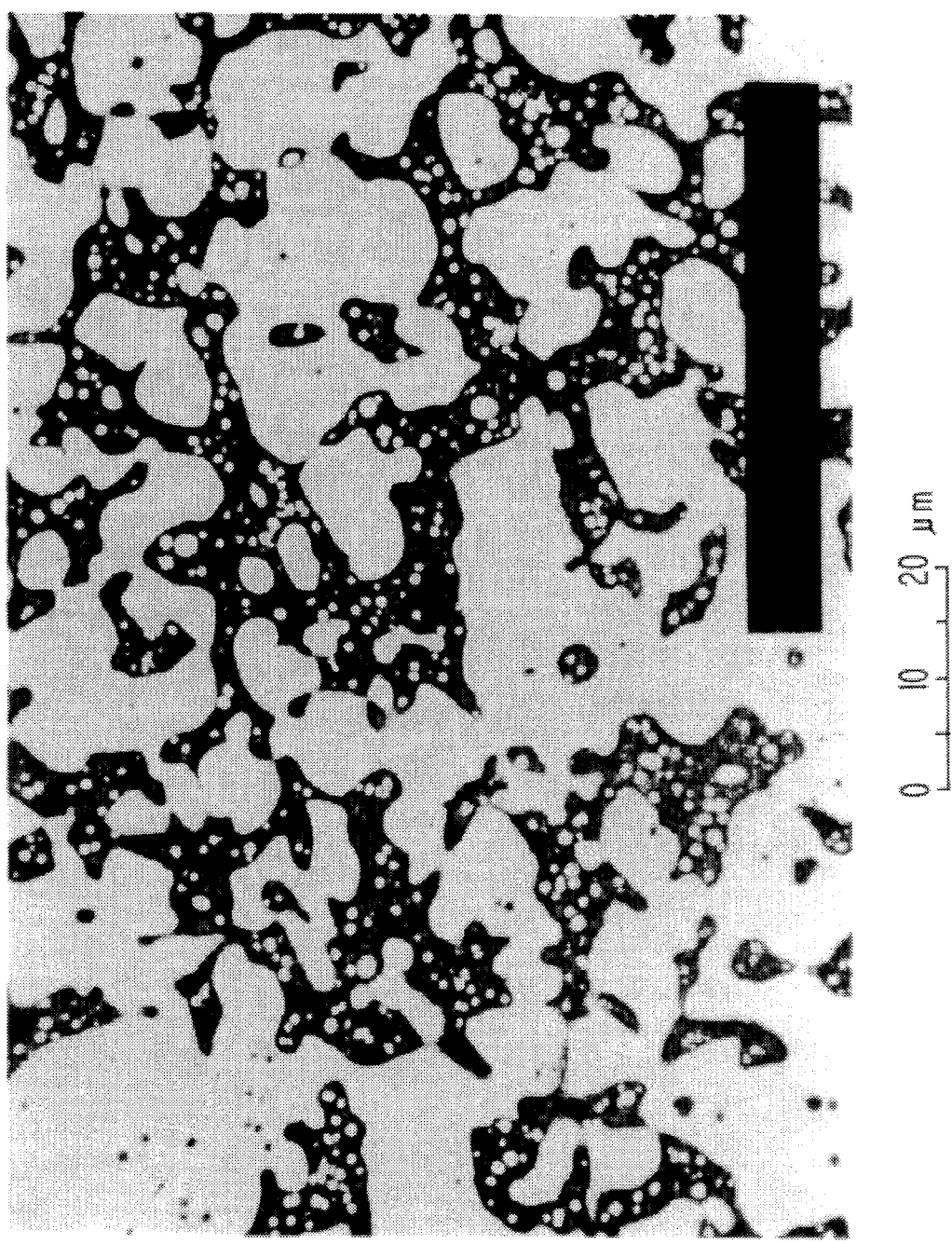
FIG. 1 shows an electron photomicrograph of a cured resin product produced as described in Example 1.

Moreover, in a preferred cured resin of the present invention, the area ratio (C)/[(A)+(B)] of a phase wherein the component (C) is a main component and a phase wherein the components (A) and (B) are main components is 0.2 or larger. As the amount of loading of the component (C) increases, this value becomes larger and toughness of the resin tends to be improved in accordance with this. When this area ratio is smaller than 0.2, the effect of improving the toughness of the resin is not sufficient. An example of morphology of a cured resin product of the present invention is shown in FIG. 1. This is a picture prepared by dyeing the polished face of the cured product of the epoxy resin of Example 1 with osmic acid and taking a picture of reflected electrons by means of a scanning electron microscope. It is clearly illustrated that two phases of different compositions exist and both phases are each continuous at least in one direction and moreover, a dispersed phase of one phase (1) exists in the continuous phase of the other phase (2) and vice versa. It is possible to distinguish a phase wherein the components (A) and (B) are main components from a phase wherein the component (C) is a main component by performing an elemental anaylsis of the same area by means of an X-ray microanalyzer. In the cured resin of this Example, it is found that one phase contains a silicon compound providing a higher concentration of elemental silicon than another phase and it is easily determined that the former is the phase wherein the component (C) is a main component. In this Example, the cured resin wherein one phase of the micro phase-separating structure contains a higher concentration of silicon than another phase exhibits higher toughness and low water absorption ratio. Such resins are especially preferred as resins of the present invention.

Moreover, the present invention provides a fiber-reinforced plastics material consisting of a thermoset resin composition comprising the components (A), (B) (optionally present) and (C) and reinforcing fiber (D) and having high toughness and high strength and a prepreg providing it. Preferred are a fiber-reinforced plastics materials wherein the reinforcing fiber is a carbon fiber and a pregreg providing it. As the matrix resin for the fiber-reinforced plastics, the optimum range of the width in the width direction of the continuous phase wherein the component (C) is a main component is smaller than the distance between fibers. Therefore, the optimum range is influenced by the fiber content, but it is in the range of about 0.01 to 10 μm and preferably 0.1 to 3 μm, which is the same as for the resin alone. Accordingly, the diameter of the dispersed phase in the continuous structure is preferably about 0.01 to 10 μm and more preferably about 0.1 to 3 μm.

Hereinbelow, each component will be described in more detail.

The component (A) in a resin composition of the present invention is a thermosetting resin. As the thermosetting resin used in the present invention, any resin which can be cured by means of an external energy such as heat, light or electron beam to form at least partially a three dimensional cured product can be used and no limitation exists. As the thermosetting resins which are especially suitable for products of the present invention, epoxy resins are first mentioned. Especially preferred are those epoxy resins which are prepared from precursors such as amines, phenols and compounds having a carbon-carbon double bond. Practically, examples of the epoxy resins whose precursors are amines are tetraglycidyldiaminodiphenylmethane, triglycidyl-p-aminophenol, triglycidyl-m-aminophenol and triglycidylaminocresol and their isomers, examples of the epoxy resins whose precursors are phenols are bisphenol A epoxy resins, bisphenol F epoxy resins, bisphenol S epoxy resins, phenol-novolak epoxy resins, cresol-novolak epoxy resins and resorcinol epoxy resins, and examples of the epoxy resins whose precursors are compounds having a carbon-carbon double bond are alicyclic epoxy resins. Moreover, brominated epoxy resins prepared by brominating these epoxy resins can be used, but the present invention is not restricted to the use of these compounds. Furthermore, mixtures of two or more of the epoxy resins can be used and monoepoxy compounds can be also incorporated.

These epoxy resins are preferably used by combining them with curing agents as the component (B). As the curing agent, any compound having an active group being reactive with the epoxy group can be used. Those compounds which have an amino group are particularly suitable. Practically, dicyandiamide, diaminodiphenylsulfone and their isomers, aminobenzoates, various acid anhydrides, phenol-novolak resins and cresol-novolak resins may, for example, be used, but the present invention is not restricted to the use of these compounds. Dicyandiamide is preferably used as it provides a prepreg having excellent storage stability. When aromatic diamines are used as the curing agent, a particularly preferred cured product of an epoxy resin is obtained. In particular, various isomers of diaminodiphenylsulfone are the most suitable ones for the present invention as they provide a cured product having excellent heat resistance. As aminobenzoates, trimethylene glycol di-p-aminobenzoate and neopentyl glycol di-p-amino-benzoate are preferably used. Compared with diamino-diphenylsulfone, they provide a cured product having excellent tensile elongation even though they have inferior heat resistance. Therefore, they can be selectively used in accordance with the desired application. When an acid anhydride represented by methylhexahydropthalic anhydride is used as the curing agent, it provides a cured product having high heat resistance and an epoxy resin composition having low viscosity and excellent workability. When phenol-novolak resins or cresol-novolak resins are used as the curing agent, it is preferable that ether bondings having excellent resistance to hydrolysis can be introduced in a molecular chain and moisture resistance of the cured product is thereby improved.

In a cured resin product of the present invention, as the component (A), maleimide resins are especially preferred. Maleimide resins may be derived from those compounds which contain 2 or more maleimide groups-on average in a molecule and may be represented by the general formula

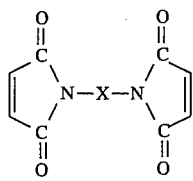

(wherein X is an alkylene group, a cylcoalkylene group, a divalent hydrocarbon group such as a monocyclic or polycyclic arylene group or a divalent hydrocarbon group bound with a divalent atomic group such as —CH$_2$—, —CO—, —SO$_2$—, —O—, —C(CH$_3$)$_2$—, —CONH') or from maleimide compounds obtained by reacting maleic anhydride with a mixed polyamine represented by the general formulae

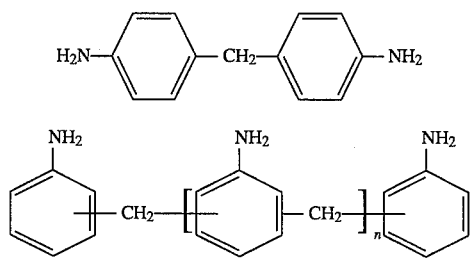

(wherein n is a positive integral number preferably from 1–4). As maleimide compounds of this type, there are, for example, N,N'-phenylenebismaleimide, N,N'-hexamethylenebismaleimide, N,N'-methylene-di-p-phenylenebismaleimide, N,N'-oxy-di-p-phenylenebismaleimide, N,N'-4,4'-benzophenonebismaleimide, N,N'-diphenylsulfone bismaleimide, N,N'-(3,3'-dimethyl)-methylene-di-p-phenylenebismaleimide, N,N'-4,4'-dicyclohexylmethanebismaleimide, N,N'-m(or p)-xylylenebismaleimide, N,N'-(3,3'-diethyl)methylene-di-p-phenylene bismaleimide, N,N'-m-tolylenedimaleimide, bismaleimide of bis(aminophenoxy) benzene and a reaction product of maleic anhydride with a mixed polyamine which is a reaction product of aniline and formaline, but the present invention is not restricted to the use of these compounds. Moreover, these maleimide compounds can be used as a mixture of two or more compounds and monomaleimide compounds such as N-allylmaleimide, N-propylmaleimide, N-hexlymaleimide and N-phenylmaleimide can be incorporated.

Maleimide resins are preferably used in combination with a curing agent as the component (B). As the curing agent, any compound which has an active group being reactive with the maleimide group can be used. Particularly suitable are those compounds which have an amino group, an alkenyl group exemplified by an allyl group, a benzocyclobutene group, an allyl-nadicimide group, an isocyanate group, a cyanate group or an epoxy group. For example, as a curing agent having an amino group, diamino-diphenylmethane is a representative compound and as a curing agent having an alkenyl group, o,o'-diallyl-bisphenol A and bis(propenylphenoxy) sulfone are cited.

Bismaleimide-triazine resins (BT rein) consisting of the bismaleimides and cyanate of the following formula are also suitable for the thermosetting resin of the present invention.

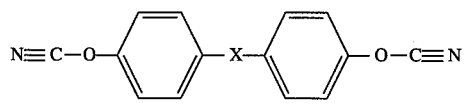

(wherein X is an alkylene group, a cycloalkylene group, a divalent hydrocarbon group such as a monocyclic or polycyclic arylene group or a divalent hydrocarbon group bound with a divalent atomic group such as —CH$_2$—, —CO—, —SO$_2$—, —O—, —C(C$_3$)$_2$—, —CONH).

The weight ratio of bismaleimide to cyanate is preferably in the range of 0/100–70/30. If the ratio sis 0/100, the compound is a triazine resin, which is also suitable for use in the present invention.

Moreover, thermosetting polyimide resins having a terminal reactive group are also suitable for the component (A). As the terminal reactive group, nadiimide group, acetylene group and benzocyclobutene group are preferable.

As the component (A), those thermosetting resins which are widely accepted in the industrial field such as phenol resins, resorcinol resins, unsaturated polyester resins, diallyl phthalate resins, urea resins and melamine resins can also be used.

The component (C) is a thermoplastics resin. This includes those thermoplastics resins which are widely accepted in the industrial field. As these thermoplastic resins, so as not to spoil the high heat resistance and high modulus which thermosetting resins originally have, aromatic thermoplastics, so called engineering plastics, are more preferable.

Furthermore, as the component (C), block copolymers or graft copolymers consisting of a molecular chain being compatible with the component (A) or (B) and another molecular chain being incompatible with the component (A) or (B) are preferable.

One of the preferred examples is a block copolymer or a graft copolymer having a molecular chain consisting of a siloxane skeleton which is originally incompatible with the component (A) or (B) and has high toughness and low water absorption ratio. An especially preferred example is a block copolymer or a graft copolymer wherein the part other than the molecular chain consisting of a siloxane skeleton consists of a polyimide skeleton, a polyamide skeleton or a polyether skeleton which is compatible with the component (A) or (B). Moreover, it is especially preferred that this block copolymer or graft copolymer has a terminal functional group which is reactive with the constitutional element (A) or (B).

Furthermore, a bulky structure in the polyamide skeleton, the polyimide skeleton or the polyether skeleton is preferred as it improves solubility in the component (A) or (B). One of the practical examples of such a bulky structure is a structure of formula I

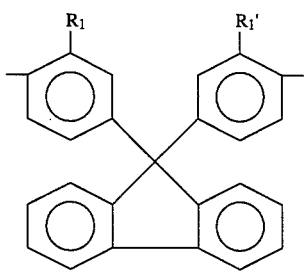

Formula I (wherein $R_1$ and $R_1'$ are each, independently of one another, selected from H and $CmH_{2H_{2m+1}}$; m is at least 1).

An example of a skeleton used as the siloxane copolymer component of the component (C) is expressed by formula II.

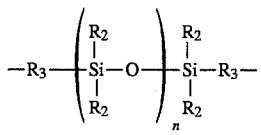

Formula II (wherein $R_2$ is a monovalent organic group, preferably a hydrocarbyl group, for example a $C_{1-4}$ alkyl or phenyl group; $R_3$ is a divalent organic group preferably a hydrocarbylene group, for example a $C_{1-4}$ alkylene or phenylene group; $R_2$ and $R_3$ are the same as or different from each other; and n is from 1–20 inclusive).

Dimethyl siloxane is especially preferred, but phenyl siloxane or its copolymer is also preferred.

On the other hand, among conventional technologies, there is one which tries to improve the toughness of a thermosetting resin by dissolving, into the uncured resin, thermoplastics resin which becomes completely compatible in a cured product, but the effect of improving the toughness is not sufficient. Moreover, there is another conventional technology which tries to improve the toughness of a thermosetting resin by dissolving within it a thermoplastics resin but which provides a structure having separate phases, which phase separation occurs during curing. However problems arise in that the effect of improving the toughness is insufficient as adhesiveness between interfaces is unstable as the morphology of the phase separation is sensitive to changes in the curing process. Moreover, when the thermoplastics resin is dissolved in the uncured resin, the viscosity of the resin increases greatly and this brings with it a decrease in workability. Furthermore, when a modifier such as a silicone resin which is originally incompatible with the matrix resin is incorporated, uniform mixing is difficult and large phase separating morphology occurs in some cases and adhesiveness of interfaces between the phases is insufficient in other cases. The effect of improving toughness therefore becomes insufficient.

However, if as the component (C) in a cured resin product of the present invention, a block copolymer or a graft copolymer comprising a molecular chain compatible with the component (A) or (B) and another molecular chain incompatible with component (A) or (B), is used, those molecular chains which are originally not uniformly mixed with component (A) or (B), such as the molecular chain of a silicone resin, become uniformly mixed under the influence of the compatible molecular chain. The compatible molecular chain part insures that, under these conditions, a sufficient adhesiveness can exist between the matrix resin, ie the components (A) and (B), and an incompatible molecular chain part. A micro phase-separation structure having a dimension such as to be effective for improving the toughness can be thereby formed and as a result, a high level of toughness which has never been obtained before can be achieved. Moreover, the existence of functional groups on the terminals of this block or graft copolymer which are reactive with the component (A) or (B) is more preferable as this can elevate adhesiveness between the interfaces of the phases.

When the thermoplastics resin component (C) has a molecular chain part in a molecule which is originally incompatible with component (A) or (B), then as compared with a thermoplastic resin having the same molecular weight but being completely compatible, the chain extension of the molecular chain in the component (A) or (B) is smaller and the increase in viscosity caused by the addition of component (C) to components (A) and (B) is unexpectedly small. Accordingly, the decrease in workability is small and the prepreg wherein this resin is used as the matrix resin exhibits excellent tack characteristics and drape characteristics as a prepreg owing to the small increase in viscosity caused by the addition of the component (C). Moreover, it is highly advantageous for improving toughness of the resin that the amount of loading of the component (C) is not strictly limited and a large amount of the component (C) can be incorporated. Furthermore, there is another advantage, namely that there is little change in the morphology of the phase separation with a change in the curing process, so that the value of toughness is also stabilised.

A block copolymer or a graft copolymer preferable as the component (C) has for example a polyimide molecular chain. A polyimide having a siloxane chain is per se known, this having been reported by J. E. McGrath at the 32nd SAMPE Symposium P.613 (1978), but there is no example wherein this compound is used for improving toughness of a cured resin product obtained, for example, from an epoxy resin. As one of the reasons for this, it is believed that this type of polyimide is not dissolved in epoxy resins and therefore, uniform mixing with the desired resin could not be obtained (as the present inventors have also confirmed by experiments). However, the present inventors have succeeded in incorporating the siloxaneimide into cured resin products from, for example, epoxy resins by copolymerising with a diamine of the formula I, given and defined above.

The polyimide chain part can be synthesised using a monomer of the following structural formula, but he copolymers used in the present invention are not restricted to these.

Diamines
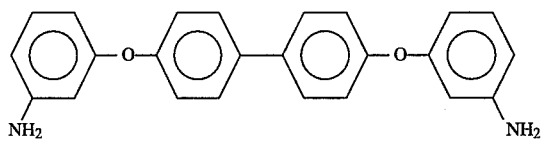
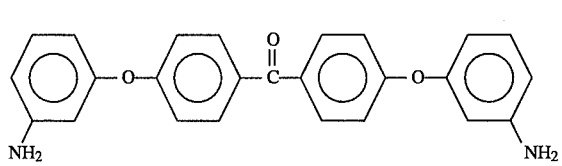
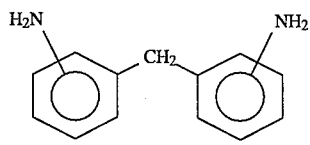
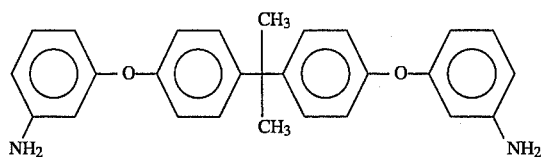
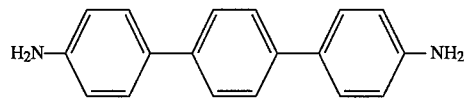
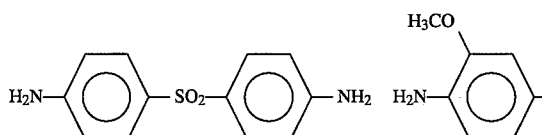
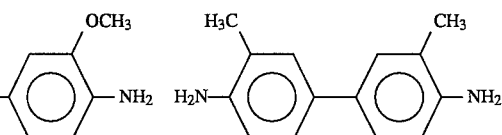
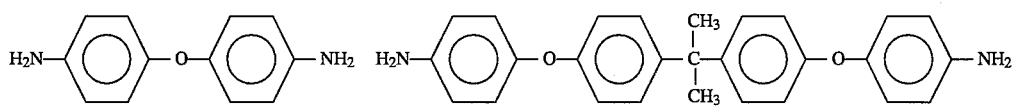
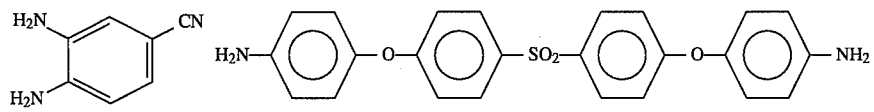
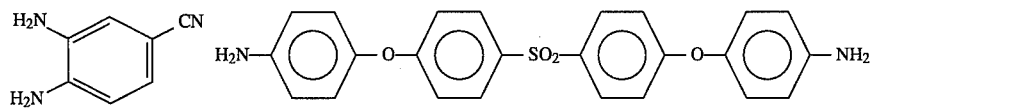
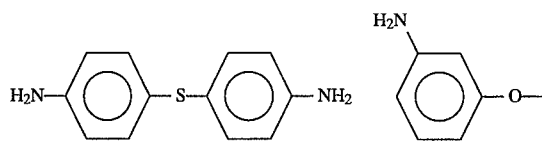
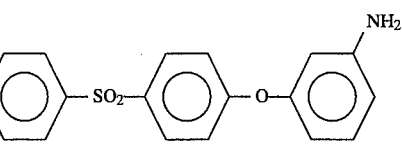
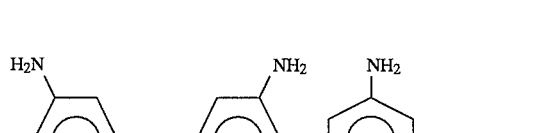
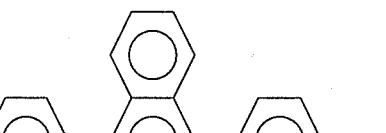
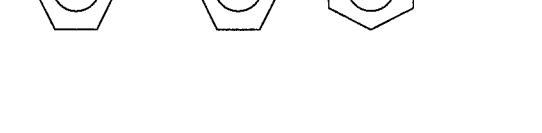
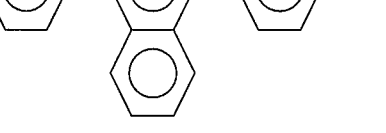
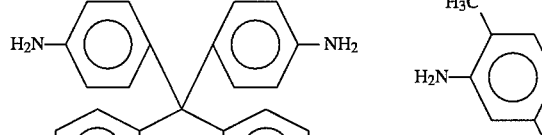
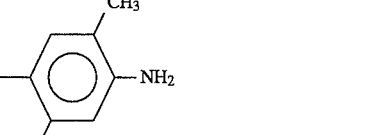

-continued
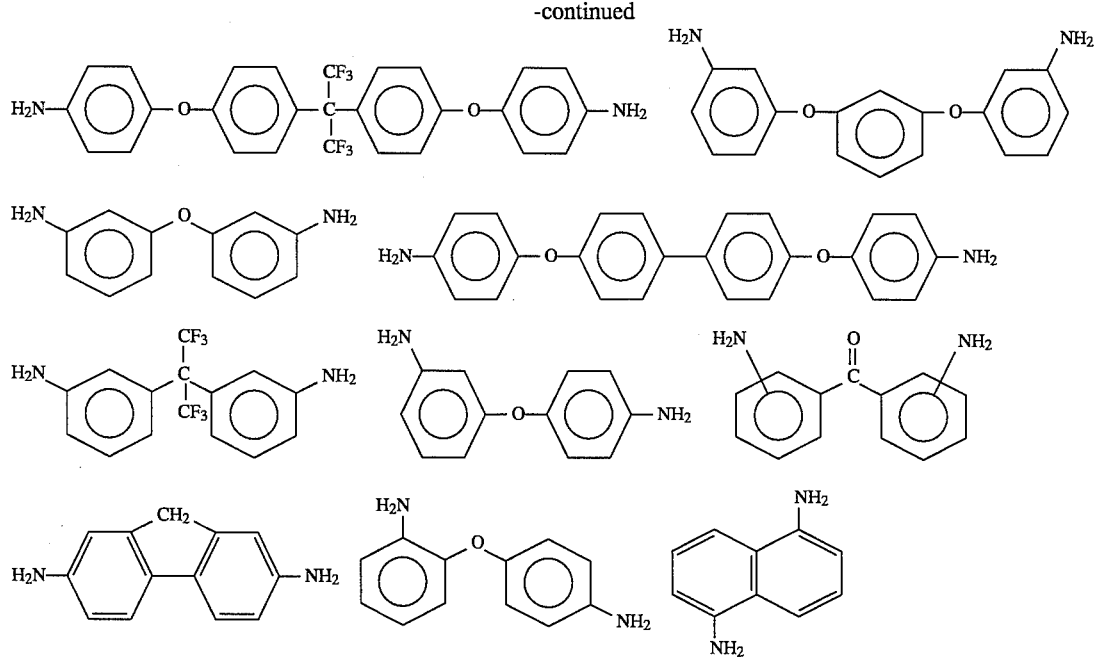
Acid dianhydrides
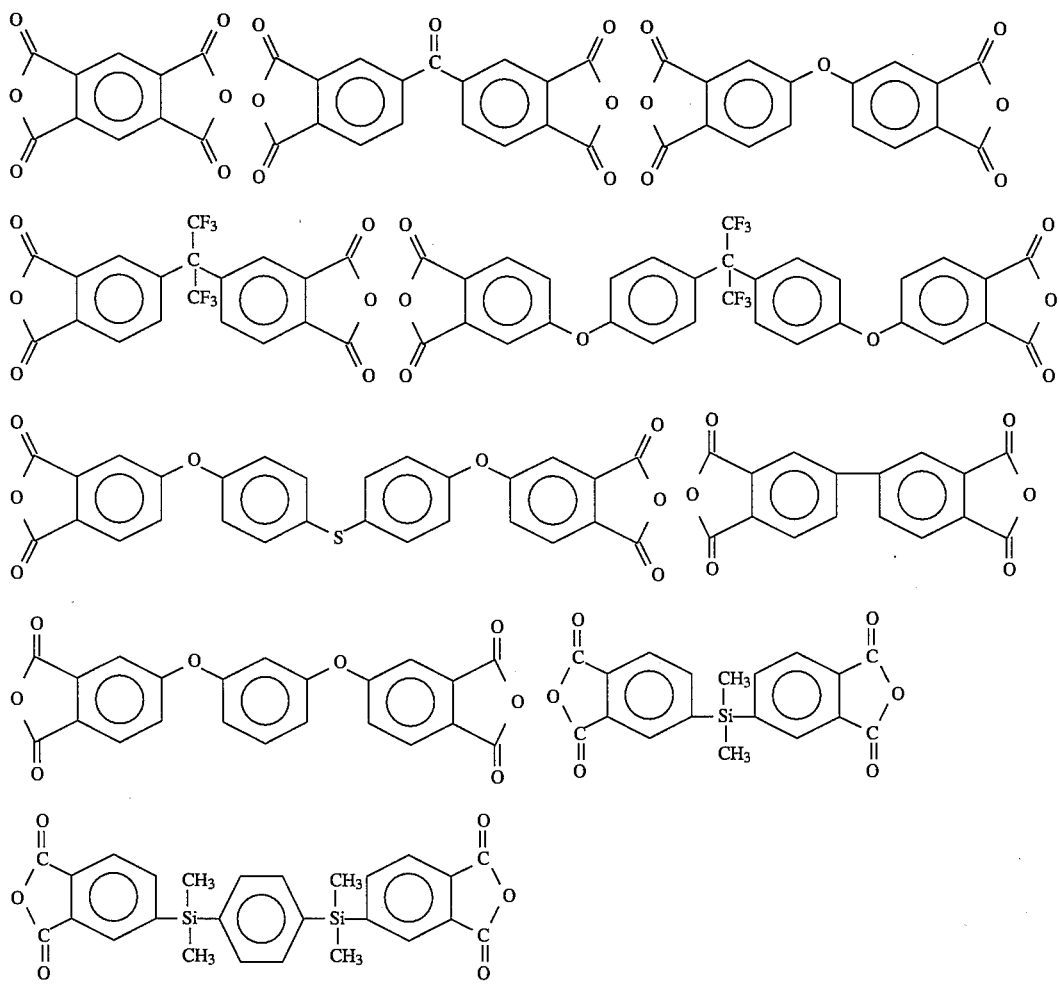

It is preferable that the amount of the component (C) is 10–50 wt. % in the resin composition. If the amount is less than this, the effect of improving the toughness is small and if the amount is more than this, the decrease in workability is remarkable. More preferably, it is 20–50 wt. %.

It is preferable that the number average molecular weight of the component (C) is in the range of about 2,000–20,000. If the molecular weight is smaller than this, the effect of improving the toughness is small and if the molecular weight is larger than this, the increase in viscosity of the resin is remarkable and the decrease in workability is also remarkable. More preferably, it is in the range of about 4,000–10,000.

According to particularly preferred aspects of the invention there is provided (i) a prepreg comprising a thermosetting resin composition, which composition comprises the components (A), (B) and (C), and reinforcing fibers (D), and (ii) a fiber reinforced plastics (FRP) material obtainable by curing the prepreg. Such a prepreg may be capable of producing FRP materials having especially high toughness and strength.

The reinforcing fibers used in such a prepreg of the present invention may be any of those fibers which have good heat resistance and tensile strength and are generally used as advanced composite materials. Examples of these reinforcing fibers are carbon fibers (for example graphite fibers), aramide fibers, silicon carbide fibers, alumina fibers, boron fibers, tungsten carbide fibers and glass fibers. Among these fibers, carbon fibers, especially graphite fibers, which have good specific strength and specific modulus and largely contribute to weight saving are most preferable for use in the present invention. It is possible to use all kinds of carbon fibers in accordance with the desired use, but high strength and high elongation carbon fibers having a tensile strength of 450 Kg/mm$^2$ or larger and a tensile elongation of 1.7% or larger are most suitable. Other reinforcing fibers can be mixed with carbon fibers for this purpose. Moreover, any space and arrangement can be utilized for using these reinforcing fibers and for example, undirectional, random directional, sheet-shaped, mat-shaped, fabric shaped and braid-shaped products can be used. For applications where especially high specific strength and specific modulus are required, a composite structure where reinforcing fibers are arranged in order in a single direction is most suitable, but cloth (fabric) structures, which are easily handled, are also suitable for use in the present invention.

The resin in the fiber-reinforced plastics preferably has the micro phase-separation structure described above and in a particularly preferred structure, the fiber-reinforced plastics material has a phase (1) wherein the component (C) is a main component and a phase (2) wherein the components (A) and (B) are the main components, which phases (1) and (2) exist separately from one another, and in which phase (2) the components (A) and (B) are distributed around the reinforcing fiber (D).

Interfacial adhesiveness between the reinforcing fiber and the matrix resin has an important roll in realizing physical properties of the fiber-reinforced plastic. For example, on impact, even if toughness of the matrix resin is at a definite level or higher, when the interfacial adhesiveness between the fiber and the resin is poor, the proportion of interfacial peeling increases to a remarkably high fraction among the fracture modes and as a result, high toughness of the resin cannot be sufficiently attained. When considering tensile strength in the non-fiber direction, the interfacial adhesiveness becomes more important and if interfacial peel easily occurs, even if a matrix resin having high toughness and high elongation is used, these characteristics cannot be maintained. The matrix resin used for a preferred fiber-reinforced plastics material of the present invention is a thermosetting resin capable itself of providing a cured product having high toughness wherein a phase in which the component (C) is a main component and a phase wherein the components (A) and (B) are main components form a micro phase-separation structure. If the fiber-reinforced plastics material has a phase in which the thermosetting resin components (A) and (B) are distributed around the reinforcing fiber (D), a strong adhesive strength between the fiber and the resin is obtained and as the interfacial peeling is suppressed, the high toughness of the resin is reflected in the high impact resistance of the whole fiber-reinforced plastics material. On the other hand, if the phase in which the component (C) is a main component were to surround the reinforcing fiber (D), the interfacial adhesiveness between the fibers and the resin would be insufficient and high toughness of the resin could not be sufficiently attained.

In a preferred embodiment of the present invention, incorporation of the thermoplastics resin component (C) into the thermosetting resin brings about the formation of a micro phase-separation structure having in the cured resin product, good interfacial adhesiveness between the thermoplastics and thermoset resins and forms a structure wherein both of the separated phases are continuous at least in one direction and preferably in a three dimensional direction. More preferably the thickness, in a width direction of the continuous phase wherein the component (C) is a main component is about 0.01 to 10 μpm. In some cases, two continuous phases each contain a dispersion phase of the other phase, one within the other. Thus a part of phase (1) may be surrounded by phase (2) and a part of phase (2) by phase (1).

The morphology may be, for the most part, a continuous network of one (thermoplastics resin) phase embedded within a second (thermoset resin) phase. However, in addition, there may be regions where, for example, the thermoplastics resin phase may include, for example, a tubular part which entirely surrounds a part of the thermoset resin phase so that at such regions, the thermoset resin phase would be discontinuous with the remaining part of the thermoset resin phase. Likewise, the thermoset resin phase may entirely surround a part of the thermoplastics resin phase.

By forming a micro phase-separation structure like this, a cured thermoset resin product is provided which has high fracture toughness and low internal stress characteristics and in which fracture strength and elongation are largely improved. Furthermore, these characteristics are highly stable. Moreover, when the thermoplastics resin component (C) contains a molecular chain consisting of a siloxane structure, the effect of decreasing the water absorption ratio of the resin becomes large. Furthermore, incorporation of the component (C) does not largely spoil high heat resistance, high modulus and good workability which the thermoset resins originally had.

The thermosetting resin composition of the present invention has a good workability and provides a cured resin product having high toughness, high elongation, high modulus, low internal stress and furthermore, high heat resistance and low water absorption ratio and high stability of these characteristics. Furthermore, a prepreg wherein this composition is used as a matrix resin exhibits good tack characteristics and drape characteristics and a fiber-reinforced composite material which is a cured product thereof has high toughness, high impact resistance, high strength and high elongation as well as high heat resistance and low water absorption ratio.

Figure 4A:
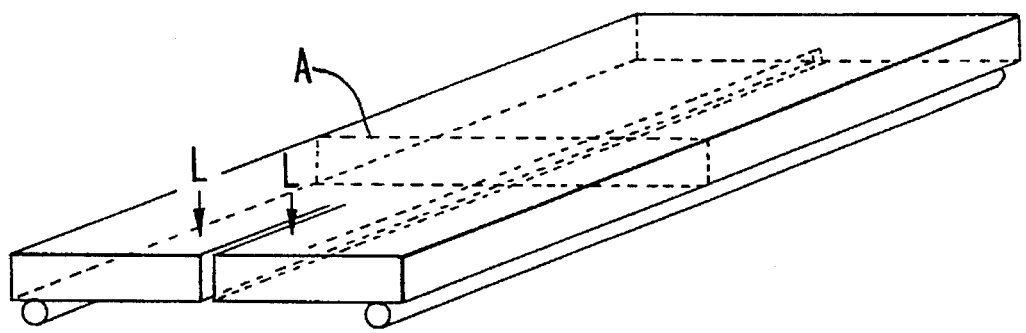
FIG. 4 illustrates the double torsion (DT) method for measuring the strain energy release rate GIC of a cured resin.
Figure 4B:
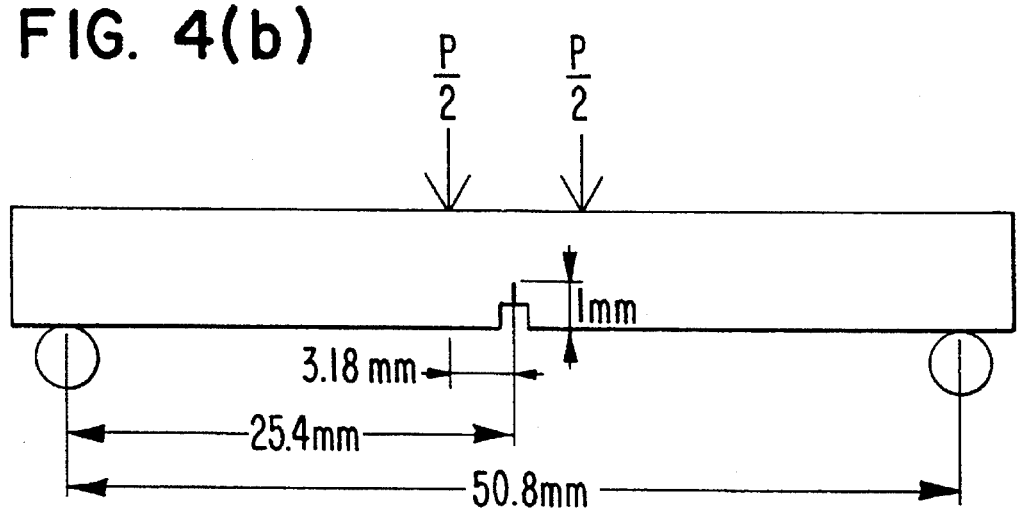
Figure 4C:
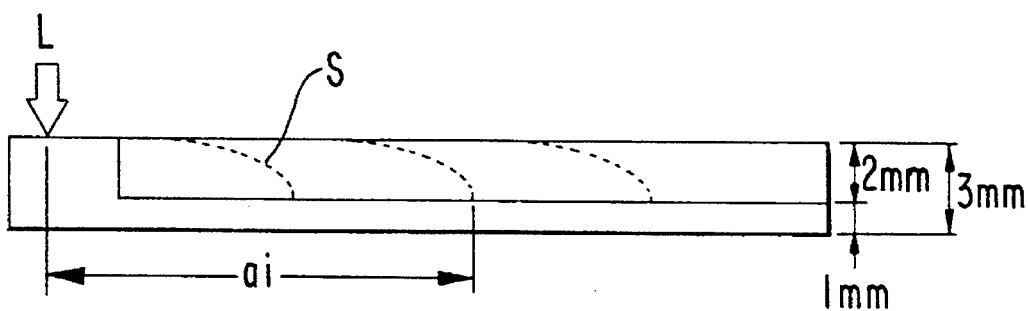

A strain energy release rate (GIC) of the cured resin prepared from the composition of the present invention is measured by means of a double torsion (DT) method. A schematic representation of the measuring method is illustrated in FIG. 4, in which FIG. 4(a) shows the test piece in position for testing and indicates the load points L, FIG. 4(b) shows the shape and size of the cross-section indicated at A in FIG. 4(a) and represents the total loading at crack appearance as P, and FIG. 4(c) shows the shape and size of fracture, striations being shown by S and the crack extension by ai.

The DT method is described in detail in the Journal of Materials Science (1985), 20, 77–84. GIC can be calculated by measuring the loading P at crack appearance, a slope C/ai of the compliance C to the distance of the crack extension ai and a sample thickness t at the part of the crack extension and using the following equation.

$$GIC=P^2(C/ai)/2t$$

(wherein the compliance C is defined by the amount of displacement δ of the crosshead at the crack appearance of the loading at the crack appearance P. C=δ/P). The speed of the crosshead on loading is 1 mm/min.

The following Examples will explain the present invention in more detail.

Example 1

Part A 218 g (0.75 mol) of 1,3-bis(3-aminophenoxy)benzene (APB), 33 g (0.094 mol) of 9,9'-bis(4-aminophenyl)fluorene (FDA), and 122 g (0.094 mol) of amino-terminated dimethyl siloxane having an $NH_2$ equivalent of 650 (commercially available from Toray Silicone Co., Ltd., BY-16-853) were stirred and dissolved in 2,000 ml of N-methyl-2-pyrrolidone (NMP) in a separable flask of 3,000 ml equipped with a nitrogen inlet, a thermometer, a stirrer and a trap for dehydration under nitrogen substitution. 250 g (0.85 mol) of solid biphenyltetracarboxylic dianhydride were added bit by bit and the mixture was stirred at room temperature for 3 hr and after elevating the temperature up to 120° C., the mixture was stirred for 2 hr. After the temperature of the flask was returned to room temperature and 50 ml of triethylamine and 50 ml of toluene were added, the temperature was elevated again and azeotropic dehydration was carried out at 160° C. to obtain about 30 ml of water. Thereafter, this reaction mixture was cooled, diluted with double the amount of NMP and poured slowly into 20 ml of acetone to precipitate an amine-terminated siloxane polyimide oligomer as a solid product.

This precipitate was vacuum-dried at 200° C. The number average molecular weight (Mn) of this oligomer was measured by means of gel permeation chromatography (GPO) using dimethylformamide (DMF) as a solvent and found to be 4,900 in terms of polyethylene glycol (PEG). The glass transition temperature determined by means of a differential scanning calorimeter (DSC) was 189° C. Introduction of the siloxane skeleton and the amine terminal was confirmed by means of NMR spectra and IR spectra.

Part B 28.7 g of siloxane polyimide oligomer obtained in part A and 50 g of resorcinol diglycidyl ether (commercially available from Wilmington Chemical Co., Ltd., HELOXY WC-69) were placed in a beaker. The mixture was heated and dissolved at 150° C. for 2 hr and 23.7 g of 4,4'-diaminophenyl sulfone (DDS) were added and dissolved for 10 min.

After vacuum defoaming was carried out by connecting the container with a vacuum pump, the content was poured into a mold (the dimension of the space was 120×120× 3 mm) which was heated at 120° C. and treated with a releasing agent in advance. The curing reaction was performed in an oven at 130° C. for 2 hr and then at 180° C. for 2 hr to prepare a cured resin sheet having a thickness of 3 mm.

The Tg of the obtained cured resin was 170° C. The sample was cut out of this sheet and the release rat of fracture strain energy GIC was measured. The value was 1,200 $J/m^2$ and the bending elastic modulus was 380 $Kg/mm^2$. The water absorption ratio measured by boiling a resin sheet of 60×10×2 mm for 20 hr was 3.0%.

A polished face of the cured resin was dyed with osmic acid and the figure of the reflected electrons thereon was observed by means of a scanning electron microscope. It was observed that two phases each basically formed as a continuous phase and a dispersed phase of another phase existed in each continuous phase. This is shown in FIG. 1. Furthermore, an elemental analysis of the same area within the range of vision was carried out by means of an X-ray microanalyszer and it was found that silicon element was densely distributed in the phase of higher contrast which could be seen as black in the picture.

Part C

A prepreg was prepared as follows.

Figure 2:
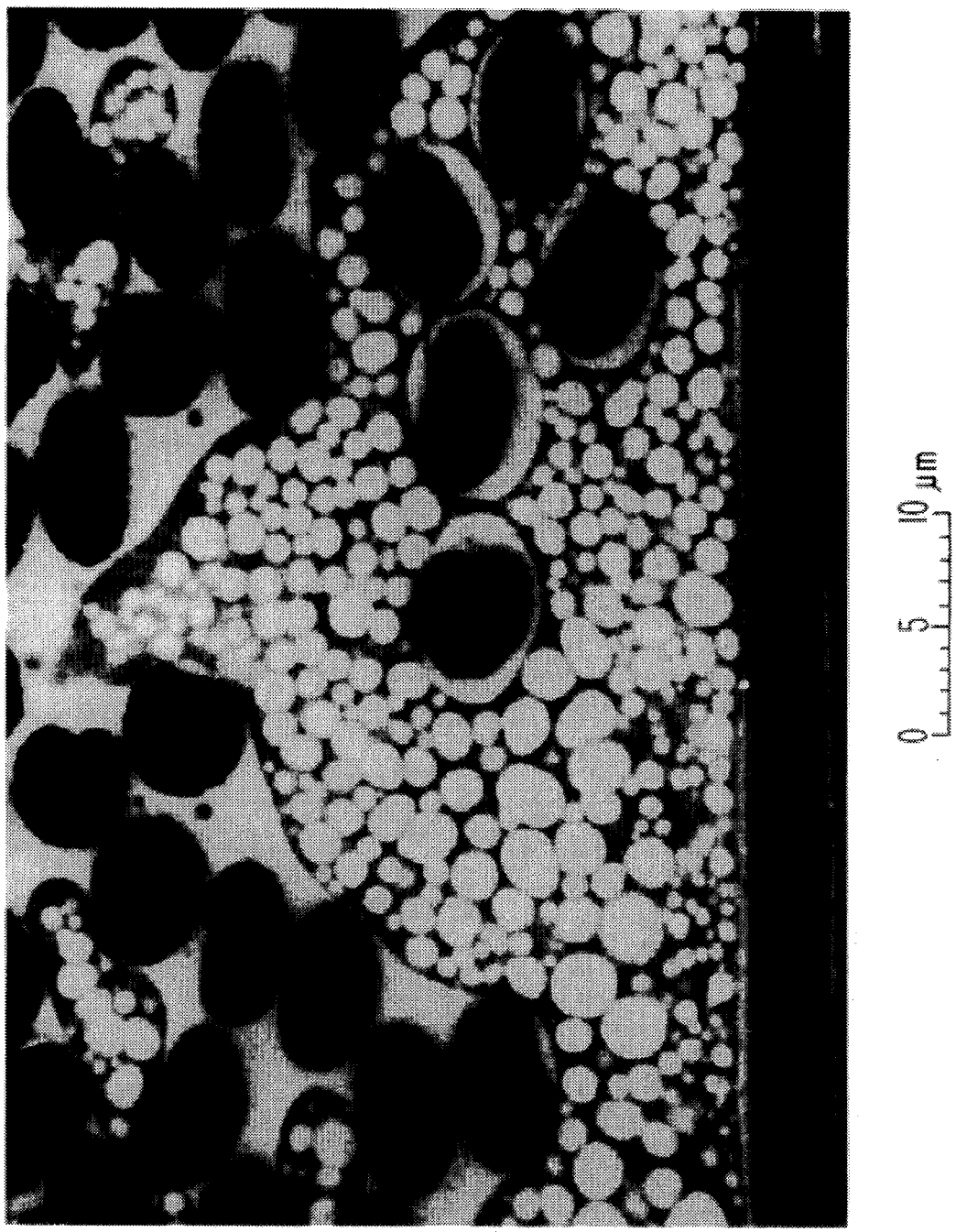
FIG. 2 shows an electron photomicrograph of a cross-section of a carbon fibre-reinforced plastics material described in Example 1.

A resin of the composition was prepared by means of a kneader and a release paper coated with a silicone releasing agent in advance was coated with this resin to a specified thickness. A carbon fiber "Torayca T800H" (manufactured by Toray Industries, Inc.) was used and the fibers were arranged in order in one direction between two sheets of the previously prepared resin coated papers and press-adhered together to obtain a prepreg. The weight fraction of the resin in this prepreg was 35% and the weight of the prepreg per unit area was 145 $g/m^2$. This prepreg was laminated to prepare 32 layers by a pseudo-isotropic arrangement ((+45°/90°/–45°/0°)4s), heated under a pressure of 6/$Kg/cm^2$ at 180° C. for 2 hr and molded by means of an ordinary vacuum bag autoclave molding method to obtain a cured sheet. The volume fraction of the fiber was 56±2%. A test piece of 4"×6" was cut out of the sheet and a compression test was carried out after an impact energy of 1,500 in lb/in had been applied. The residual compression strength was 48 ksi. Moreover, 16 sheets of the prepregs were laminated in a single direction and molded in the same way to obtain a cured sheet. The 90° tensile elongation thereof was measured and the value was 1.4%. The polished face of this carbon fiber reinforced plastics was dyed with osmic acid and the figure of reflected electrons thereon was observed by means of a scanning electron microscope. This is shown in FIG. 2. Basically, a morphology similar to that of the resin alone was observed, but it was confirmed that an epoxy resin phase was distributed around the interfacial part between the carbon fiber and the epoxy resin and the high contrast phase (imide oligomer phase) wherein the silicon element was densely distributed was scarcely brought into contact with the carbon fiber.

Example 2

As component (C), 40 g of the siloxane polyimide oligomer of Example 1 Part a, 21.5 g of resorcinol diglycidyl ether (commercially available from Wilmington Chemical Co., Ltd., HELOXY WC-69) and 21.5 g of bisphenol F diglycidyl ether (commercially available from Dainippon Ink and Chemicals Inc., Epichlon 830) were mixed in a beaker. The mixture was heated and dissolved at 150° C. for 2 hr and then 16.7 parts of 4,4'-diaminodiphenyl sulfone (DDS) were added and allowed to dissolve for 10 min.

Thereafter, vacuum defoaming was carried out by connecting the container with a vacuum pump, the content was poured into a mold (the dimension of the space was 120× 130×3 mm) which was treated with a releasing agent and heated at 120° C. in advance. The curing reaction was performed in an oven at 180° C. for 2 hr to prepare a cured resin sheet having thickness of 3 mm.

The Tg of the obtained cured resin was 165° C. sample was cut out of this sheet and the release ratio of fracture strain energy GIC was measured. The value was 1,500 J/m$^2$ and the bending elastic modulus was 375 kg/mm$^2$. The water absorption ratio measured by boiling a resin sheet of 60×10×2 mm for 20 hr was 2.6%.

A polished face of the cured resin was dyed with osmic acid and the figure of the reflected electrons thereon was observed by means of a scanning electron microscope. It was observed that two phases were each basically formed as a micro phase-separation structure which was a continuous phase. Furthermore, an elemental analysis of the same area was carried out by means of an X-ray microanalyzer and it was found that a phase wherein silicon element was densely distributed existed.

Example 3

As a component (C), 30 g of the siloxane polyimide oligomer of Example 1 Part A was added to 39 g of diphenylmethanebismaleimide and 31 g of o,o'-diallybisphenol A and heated and dissolved at 150° for 2 hr.

Thereafter, vacuum defoaming was carried out by connecting the container with a vacuum pump, the content was poured into a mold which was treated with a releasing agent and heated at 120° C. in advance. The curing reaction was performed in an oven at 180° C. for 2 hr to prepare a cured resin sheet having a thickness of 3 mm.

Furthermore, post curing of this cured sheet was performed at 200° C. for 2 hr and at 250° C. for 6 hr. The Tg of the obtained cured resin was 295° C. The release rate of fracture strain energy GIC was 600 J/m$^2$ and the bending elastic modulus was 380 Kg/mm$^2$. The water absorption ratio measured by boiling a resin sheet of 60×10×2 mm for 20 hr was 2.0%.

A polished face of the cured resin was dyed with osmic acid and the figure of the reflected electrons thereon was observed by means of a scanning electron microscope. It was observed that a micro phase-separation structure was formed. An elemental analysis was carried out by means of an X-ray microanalyzer and it was found that silicon element was densely distributed in a dark phase.

Example 4

Part A 392 g (0.91 mol) of bis[4-(3-aminophenoxy)phenyl]sulfone (BAPS-M), 39 g (0.11 mol) of 9,9'-bis(4-aminophenyl)fluorene (FDA), 147 g (0.11 mol) of an amino-terminated dimethyl siloxane having an NH$_2$ equivalent of 650 (commercially available from Toray Silicone Co., Ltd., BY-16-853) and 300 g (1.02 mol) of biphenyltetracarboxylic dianhydride were used as the raw materials. Other procedures were the same as those of Example 1 to synthesize a siloxane polyimide oligomer.

The number average molecular weight (Mn) of this oligomer was 5,500 in terms of polyetheylene glycol (PEG). The glass transition temperature determined by means of differential scanning calorimeter (DSC) was 223° C. Moreover, introduction of the siloxane skeleton and the amine terminal was confirmed by means of NMR spectra and IR spectra.

Part B 30 g of siloxane polyimide oligomer obtained in Part A, 25 g of resorcinol diglycidyl ether and 25 g of phenolnovolak epoxy resin (Epicoat 152 manufactured by Yuka Shell Epoxy Co., Ltd.) were added to a beaker and heated and dissolved. Then, 20 g of 4,4'-diaminodiphenyl sulfone (DDS) were added. The same procedures as those of Example 1 were repeated. The Tg of the obtained cured resin was 185° C. The release rate of fracture strain energy GIC was 1,500 J/m$^2$ and the bending elastic modulus was 300 Kg/mm$^2$. The water absorption ratio measured by boiling a resin sheet of 60×10×2 mm for 20 hr was 2.5%.

Figure 3:
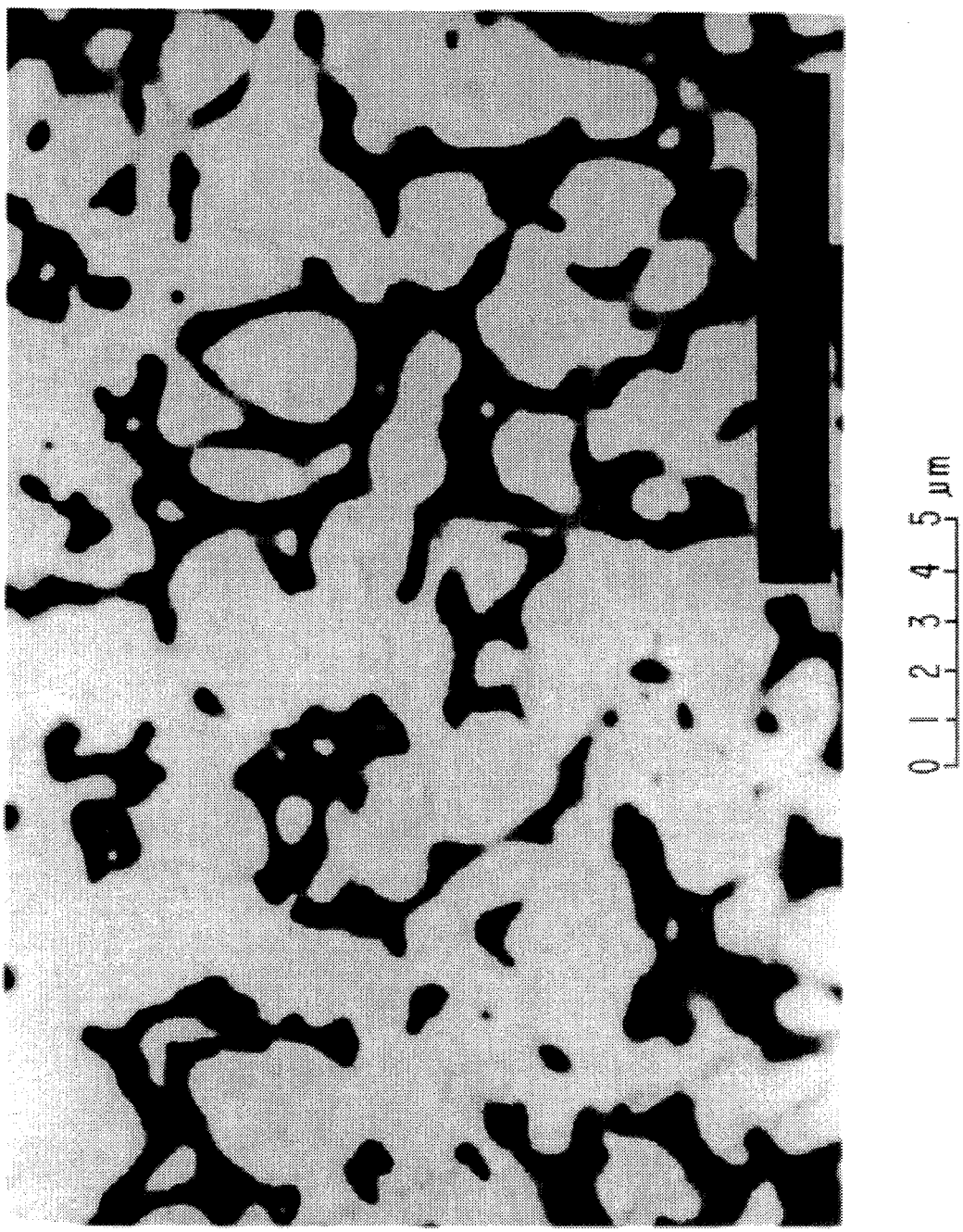
FIG. 3 shows an electron photomicrograph of a cured resin product described in Example 4.

A polished face of the cured resin was dyed with osmic acid and the figure of the reflected electrons thereon was observed by means of a scanning electron microscope. It was observed that a microphase separation structure wherein two phases each of which was a continuous phase was basically formed. This is illustrated in FIG. 3. Furthermore, an elemental anaylsis of the same area was carried out by means of an X-ray microanalyzer and it was found that silicon element was densely distributed in a dark phase.

Comparative Example 1

Part A 208 g (0.712 mol) of bis(3'-aminophenoxy)benzene (APB) and 62 g (0.178 mol) of 9,9'-bis(4-aminophenyl)fluorene (FDA) were stirred and dissolved in 2,000 ml of N-methyl-2-pyrrolidone (NMP) in a separable flask of 3,000 ml equipped with a nitrogen inlet, a thermometer, a stirrer and a trap for dehydration under nitrogen substitution. 240 g (0.816 mol) of solid biphenyltetracarboxylic dianhydride were added bit by bit and the mixture was stirred at room temperature for 5 hr. Thereafter, 50 ml of triethylamine and 50 ml of toluene were added, the temperature was elevated again and azeotropic dehydration was carried out at 160° C. to obtain about 30 ml of water. After this reaction mixture is cooled, it was diluted with double the amount of NMP and poured slowly into 20 ml of acetone to precipitate an amine-terminated polyimide oligomer as a solid product. This precipitate was vacuum-dried at 200° C. The number average molecular weight (Mn) of this oligomer was measured by means of gel permeation chromatography (GPC) by using dimethyl-formamide (DMF) as a solvent and was found to be 5,000 in terms of polyethylene glycol (PEG). The glass transition temperature determined by means of a differential scanning calorimeter (DSC) was 210° C. The amine terminal was confirmed by means of NMR spectra and IR spectra.

Part B 28.7 g of polyimide oligomer obtained in part A and 50 g of resorcinol diglycidyl ether (commercially available from Wilmington Chemical Co., Ltd., HELOXY WC-69) were added in a beaker. The mixture was heated and dissolved at 150° C. for 2 hr and them 23.7 g of 4,4'-diaminodiphenyl sulfone (DDS) were added and dissolved for 10 min.

Thereafter, vacuum defoaming was carried out by connecting the container with a vacuum pump, the content was poured into a mold (the dimension of the space was 120× 120×3 mm) which was treated with a releasing agent and heated at 120° C. in advance. The curing reaction was performed in an oven at 180° C. for 2 hr to prepare a cured resin sheet having a thickness of 3 mm.

The Tg of obtained cured resin was 175° C. A sample was cut out of this sheet and the release rate of fracture strain energy GIC was measured. The value was 300 J/m² and the bending elastic modulus was 385 K/mm². The water absorption ratio measured by treating a resin sheet of 60×10×2 mm with boiling water for 20 hr was 4.0%.

A polished face of the cured resin was dyed with osmic acid and the figure of the reflected electrons thereon was observed by means of a scanning electron microscope. A completely uniform and transparent structure was observed and no phase separation was recognised.

Part C

Compression strength after impact and tensile elongation in the 90° C. direction of a composite prepared by using a unidirectional prepreg and this resin as a matrix were measured. The prepreg was prepared as follows.

A resin of the composition was prepared by means of a kneader and a release paper coated with a silicone releasing agent in advance was coated with this resin of a specified thickness. A carbon fiber "Torayca T800H" (manufactured by Toray Industries, Inc.) was used and the fibers were arranged in order in one direction between two sheets of the previously prepared resin-coated papers and press-adhered together to obtain a prepreg. The weight fraction of the resin in this prepreg was 35% and the weight of the prepreg per unit was 145 g/m². This prepreg was laminated to prepare 32 layers by a pseudo-isotropic arrangement ((±45°/90°/–45°/0°)4s), heated under a pressure of 6/Kg/cm² at 180° C. for 2 hr and molded by means of an ordinary vacuum bag autoclave molding method to obtain a cured sheet. The volume fraction of the fiber was 56±2%. A test piece of 4"×6" was cut out of the sheet and a compression test was carried out after an impact energy of 1,500 in lb/in had been applied. The residual compression strength was 28.5 ksi. 16 sheets of the prepregs were laminated in a single direction and molded by the same procedures to obtain a cured sheet. The 90° tensile elongation measured by using the cured sheet was 0.7%.

Comparative Example 2

28.7 g of an amino-terminated dimethyl siloxane oligomer having an $NH_2$ equivalent of 2,200 (commercially available from Toray Silicone Co., Ltd., BY-16-853B) and 50 g of resorcinol diglycidyl ether (commercially available from Wilmington Chemical Co., Ltd., HELOXY WC-69) were mixed in a beaker and heated up to 150° C., but dimethyl siloxane was not dissolved (no uniform mixing) and remained as an oil drop-shaped large separation.

Comparative Example 3

A resin sheet was prepared without adding a siloxane imide oligomer as a component (C) and by repeating the same procedures as those of Example 1. The release rate of fracture strain energy GIC was measured and it was found that the value was 150 J/m².

Comparative Example 4

A resin sheet was prepared without adding a siloxane imide oligomer as a component (C) and by repeating the same procedures as those of Example 1. The release rate of fracture strain energy GIC was 150 J/m² and the bending elastic modulus was 385 Kg/mm². Th water absorption ratio after boiling for 20 hr was 4.0%.

We claim:

1. A cured resin product comprising a thermoset resin (A) and a thermoplastic resin (C), wherein the cured resin product comprises at least a phase (1) in which the thermoplastics resin (C) is at least a major constituent; and a phase (2) in which the thermoset resin (A) is at least a major constituent, each of said phases (1) and (2) is separate from the other and has a three dimensionally continuous structure, and phase (1) contains a silicon containing compound and has a concentration of elemental silicon higher than that in any other phase, wherein the cured resin product is formed from a thermoplastics resin (C) comprising a copolymer selected from the group consisting of block and graft copolymers, which copolymer has a siloxane molecular chain originally incompatible with, and a molecular chain selected from the group consisting of polyimide, polyamide and polyether molecular chains compatible with, the thermoset resin (A), wherein the thermoset resin (A) comprises a resin selected from the group consisting of epoxy, maleimide, triazine, polyimide and phenol resins, and combinations thereof, cured with a curing agent (B), and the thermoplastics resin (C) has terminal groups chemically combined with the thermoset resin (A), wherein the thermoplastics resin (C) additionally contains residues having a structure (a)

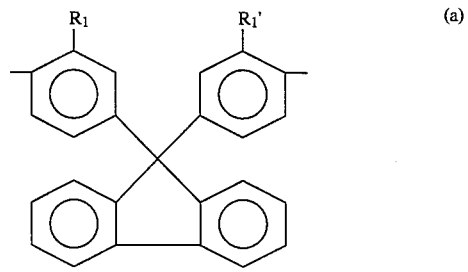

where $R_1$ and $R_1'$ are, independently of one another, each selected from H and a group $C_mH_{2m+1}$, where m is at least 1.

2. A resin composition comprising a thermosetting resin (A), a curing agent B) and a thermoplastics resin (C), which is soluble in the resin (A), wherein the thermoplastics resin (C) is a copolymer selected from the group consisting of block copolymers and graft copolymers each comprising a molecular chain compatible with, and a molecular chain incompatible with, at least one of the thermosetting resin (A) and curing agent (B) wherein the thermoplastic resin (C) is selected from the group consisting of polyimides, polyamides and polyethers each having a siloxane molecular chain, wherein the thermoplastics resin (C) additionally contains residues having a structure of formula (a)

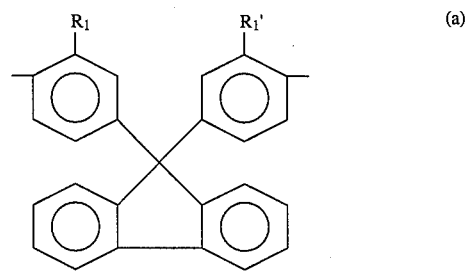

where $R_1$ and $R_1'$ are, independently of one another, each selected from H and a group $C_mH_{2m+1}$, where m is at least 1.

3. A cured resin product comprising a thermoset resin (A) and a thermoplastic resin (C), wherein the cured resin product comprises at least a phase (1) in which the thermoplastics resin (C) is at least a major constituent; and a phase (2) in which the thermoset resin (A) is at least a major constituent, each of said phases (1) and (2) is separate from the other and has a three dimensionally continuous structure, and phase (1) contains a silicon containing compound and has a concentration of elemental silicon higher than that in any other phase, wherein the cured resin product is formed from a thermoplastics resin (C) comprising a copolymer selected from the group consisting of block and graft copolymers, which copolymer has a siloxane molecular chain originally incompatible with, and a molecular chain selected from the group consisting of polyimide, polyamide and polyether molecular chains compatible with, the thermoset resin (A), wherein the thermoplastics resin (C) is selected from the group consisting of polyimides and polyamides each having a siloxane molecular chain.

4. A cured resin product according to claim 3, wherein the thermoplastic resin is a polyimide having a siloxane molecular chain.

5. A cured resin product comprising a thermoset resin (A) and a thermoplastic resin (C), wherein the cured resin product comprises at least a phase (1) in which the thermoplastics resin (C) is at least a major constituent; and a phase 2) in which the thermoset resin (A) is at least a major constituent, each of said phases (1) and (2) is separate from the other and has a three dimensionally essentially continuous structure, and the cured resin product additionally includes regions where one of the phases (1) and (2) essentially surrounds the other, wherein the cured resin product is formed from a thermoplastics resin (C) comprising a Copolymer selected from the group consisting of block and graft copolymers, which copolymer has a siloxane molecular chain originally incompatible with, and a molecular chain selected from the group consisting of polyimide, polyamide and polyether molecular chains compatible with, the thermoset resin (A), wherein the thermoplastics resin (C) is selected from the group consisting of polyimides and polyamides each having a siloxane molecular chain.

6. A cured resin product according to claim 5, wherein the thermoplastic resin is a polyimide having a siloxane molecular chain.

7. A cured resin product having a thermoset resin (A) and a thermoplastic resin (C), wherein the cured resin product is formed from a thermoplastics resin (C) comprising a copolymer selected from the group consisting of block and graft copolymers, which copolymer has a siloxane molecular chain originally incompatible with, and a molecular chain selected from the group consisting of polyimide, polyamide and polyether molecular chains compatible with, the thermoset resin A); wherein said cured resin product has a strain energy release rate (GIC) of at least 400 J/m$^2$, a flexural modulus of at least 300 Kg/mm$^2$, a glass transition temperature (Tg) of at least 120° C., at least two phases, each of which phases has a three dimensionally continuous structure, and one of which phases contains a silicon containing compound and has a concentration of elemental silicon higher than in any other phase, wherein the thermoplastics resin (C) is selected from the group consisting of polyimides and polyamides each having a siloxane molecular chain.

8. A cured resin product according to claim 7, wherein the thermoplastic resin is a polyimide having a siloxane molecular chain.

9. A cured resin product comprising a thermoset resin component (A) and a thermoplastics resin component (C), Said thermoplastics resin and thermoset resin component (C) and (A) being present at least partly in respective phases (1) and (2), each of said phases being continuous and one of said phases (1) and (2) contains a silicon containing compound and has a concentration of elemental silicon higher than that in any other phase, wherein the cured resin product is formed from a thermoplastics resin (C) comprising a copolymer selected from the group consisting of block and graft copolymers, which copolymer has a siloxane molecular chain originally incompatible with, and a molecular chain selected from the group consisting of polyimide, polyamide and polyether molecular chains compatible with, the thermoset resin (A), wherein the thermoplastics resin (C) is selected from the group consisting of polyimides and polyamides each having a siloxane molecular chain.

10. A cured resin product according to claim 9, wherein the thermoplastic resin is a polyimide having a siloxane molecular chain.

11. A resin composition comprising a thermosetting resin (A), a curing agent (B) and a thermoplastics resin (C), which is soluble in the resin (A), wherein the thermoplastics resin (C) is a copolymer selected from the group consisting of block copolymers and graft copolymers each comprising a molecular chain compatible with, and a molecular chain incompatible with, at least one of the thermosetting resin (A) and curing agent (B), wherein the thermoplastics resin (C) is selected from the group consisting of polyimides and polyamides each having a siloxane molecular chain.

12. A resin composition according to claim 11, wherein the thermoplastic resin is a polyimide having a siloxane molecular chain.

* * * * *